J. L. RAMALEY.
Animal Trap.

No. 229,913.  Patented July 13, 1880.

Witnesses:
W. W. Mortimer.
Otto Stein.

Inventor:
Jas. L. Ramaley,
per
J. A. Lehmann,
atty.

UNITED STATES PATENT OFFICE.

JAMES L. RAMALEY, OF SPRINGDALE, PENNSYLVANIA.

ANIMAL-TRAP.

SPECIFICATION forming part of Letters Patent No. 229,913, dated July 13, 1880.

Application filed January 17, 1880.

*To all whom it may concern:*

Be it known that I, JAMES L. RAMALEY, of Springdale, in the county of Allegheny and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in an arrangement of parts by which the animal caught is made to reset the trap by its own weight, so as to entrap others, while the animals caught remain captives, as will be fully described hereinafter.

The accompanying drawings represent my invention.

Figure 1:
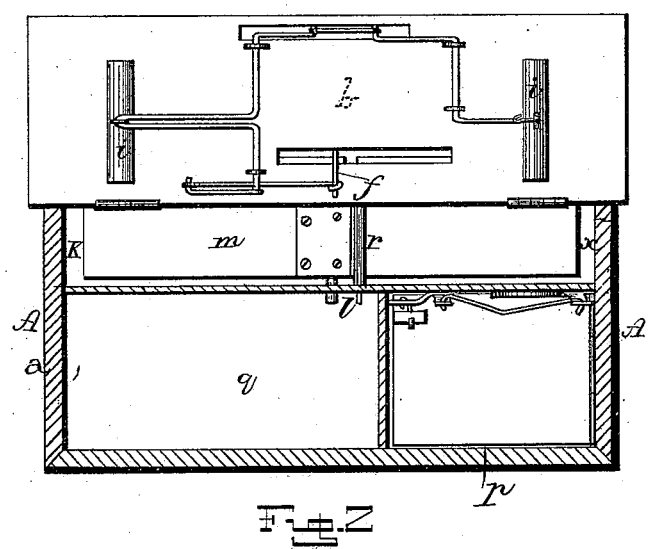
Figure 2:
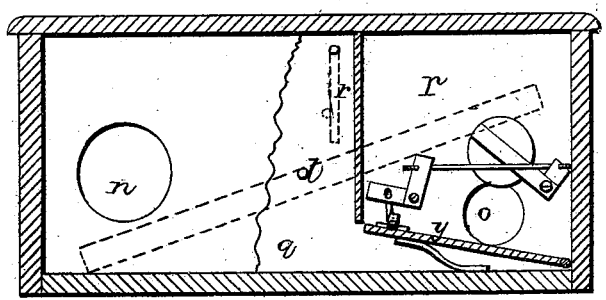
Figure 3:
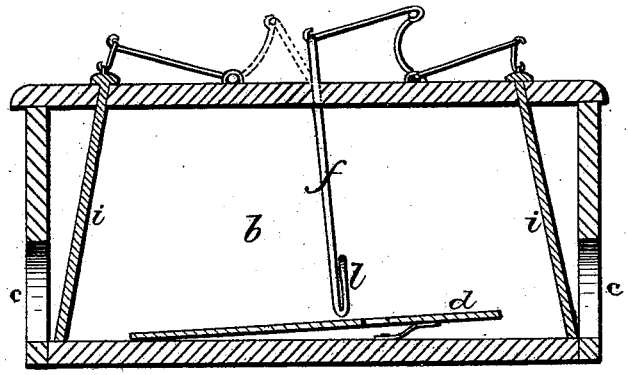

Figure 1 is a plan view of my invention. Figs. 2 and 3 are longitudinal vertical sections of the same, taken through the two chambers *a* and *b*.

The oblong box A represents the trap. The box is longitudinally divided into two unequal chambers, of which the larger one, *a*, is again subdivided and provided on top with a hinged lid, but the smaller one, *b*, has its top fastened down.

At both ends, near the bottom of the box and opposite to one another, are holes *c*, opening into the smaller chamber *b*, sufficiently large for animals to enter.

Within, at the bottom of the passage through the chamber *b*, occupying its entire width and reaching to within a few inches of the outer holes, *c*, is a light flat piece of wood, *d*, hinged at one end near the bottom of the box, while the loose end is slightly raised and upheld by a spring underneath, so as to form an inclined plane. Upon this the bait for the animals to be caught is placed, and the spring supporting this end of the piece *d* with the bait is calculated to yield to a slight increase in downward pressure. At the inner edge of the piece *d* a notch or hole is cut, into which the lower end of a lever, *f*, enters, and is held as long as the piece *d* is upheld, but released when the piece is depressed. One arm of the lever *f* extends upward through a slot in the fastened top on the box A, and is attached by connecting-rods to a system of levers, by which, when acted upon by the former, two drop-gates, *i*, are raised up. The gates *i*, moving slantingly in slots through the top, drop down by their own weight and close the holes *c* at both ends when released, which occurs when the lower end of the slightly-bent lever *f* is set free from its hold in the notch in the piece *d* by a downward pressure on that end. The lower end of the lever *f* is turned upward and forms the arm *l*, which, after ascending a short distance, passes at a right angle through the middle of the separation-wall between the two chambers *a* and *b*, and extends entirely across the compartment K. Rigidly secured to this part of the arm *l* which passes through the chamber K is the platform *m*, which is nearly as long and wide as the chamber K, in which it is placed. As the arm *l* and lever *f* are made from one piece, and as the lower end of the lever *f* is locked in place, when the doors *i* are raised, by means of the hole in piece *d*, this platform *m* cannot be moved while the doors *i* are raised; but when the animal has depressed the piece *d* so as to release the lower end of the lever *f*, the falling of the doors *i* causes the lever *f* to move to one side at its upper end, and thus turn the arm *l* partially around, and this turning causes the platform to drop down at the end that is next to the hole *n*.

When the doors are raised again for the purpose of setting the trap the upper end of the lever moves laterally again, and this movement causes the arm to raise the end of the platform above the hole *n*, in which position it remains until the animal depresses the opposite end by its weight. Hence, to set the trap, it is only necessary to press down the end of the piece *m* upheld by the spring, when both gates will be simultaneously opened.

In the separation-wall, between the chambers *a* and *b*, is a hole, *n*, opening a communication between the chambers *b* and K. This hole serves to allow the animal, when caught between the two gates, to escape into K, where it is met by a swinging gate, *r*, which only yields in one direction. Pushing against this the animal finds itself confined in the chamber *x*, over the end of the piece *m*, which, yielding to the pressure caused by the weight of the animal, sets the trap anew and simultaneously discloses another opening, $o$, which leads to the space $p$, another compartment of the chamber $a$.

The bottom $y$ of the space $p$ is hinged at one end and raised at the opposite by means of a spring underneath, and connected by rods and levers with a door or cover for the hole $o$, so that when the animal enters into the space $p$ the bottom sinks down under its weight, closes the hole $o$, and presents a new opening to the frightened animal under the partition between the spaces $p$ and $q$, where, after passing through, it remains confined, since the pressure upon the bottom in the space $p$ is removed, and the bottom reassumes its elevated position, whereby the passage is closed.

Having thus described my invention, I claim—

1. The combination of the platform $d$, having a hole for the lower end of the lever to catch in, with the lever $f$, having its upper end connected to a mechanism for closing the doors $i$, and its lower end turned up to form the arm $l$, to which the platform $m$ is secured, substantially as set forth.

2. The combination of the arm $l$ of the lever $f$ with the platform $m$, hinged gate $r$, and the two partitions having the holes $n$ $o$ through them, substantially as described.

In testimony that I claim the foregoing I have hereunto set my hand this 7th day of January, 1880.

JAMES L. RAMALEY.

Witnesses:
 T. F. LEHMANN,
 OTTO STEIN.